United States Patent [19]
Parkinson

[11] 3,843,576
[45] Oct. 22, 1974

[54] AQUEOUS COATING COMPOSITIONS OF ETHYLENE/ACRYLIC ACID COPOLYMER AND PHENOLIC RESIN

[75] Inventor: Robert E. Parkinson, Monroeville Borough, Pa.

[73] Assignee: United States Steel Corporation, Pittsburgh, Pa.

[22] Filed: Dec. 28, 1973

[21] Appl. No.: 429,444

Related U.S. Application Data

[63] Continuation of Ser. No. 290,599, Sept. 20, 1972, abandoned, which is a continuation-in-part of Ser. No. 139,197, April 30, 1971, abandoned.

[52] U.S. Cl.............. 260/29.3, 117/148, 117/132, 117/155 UA, 156/335, 161/215, 161/68, 260/28.5 AS
[51] Int. Cl. ................. C08g 51/24, C08f 45/24
[58] Field of Search............. 260/29.3, 28.5 AS, 848

[56] References Cited
UNITED STATES PATENTS

| | | | |
|---|---|---|---|
| 2,902,458 | 9/1959 | Teppema | 260/29.3 |
| 2,902,459 | 9/1959 | Teppema | 260/29.3 |
| 3,041,301 | 6/1962 | Armour | 260/29.3 |
| 3,392,131 | 7/1968 | Miles | 260/848 |
| 3,438,931 | 4/1969 | Mitchell | 260/848 |
| 3,644,262 | 2/1972 | Stehle | 260/29.6 R |

*Primary Examiner*—Morris Liebman
*Assistant Examiner*—P. R. Michl
*Attorney, Agent, or Firm*—Ralph H. Dougherty

[57] ABSTRACT

Aqueous dispersions in which ethylene-carboxylic acid copolymers and a low molecular weight phenolic resin are combined to produce a material useful as an adhesive, insulator, primer or coating. Additives enhancing the properties of the composition are also disclosed.

6 Claims, No Drawings

AQUEOUS COATING COMPOSITIONS OF ETHYLENE/ACRYLIC ACID COPOLYMER AND PHENOLIC RESIN

CROSS REFERENCE TO RELATED APPLICATION

This is a continuation of application Ser. No. 250,599, filed Sept. 20, 1972, now abandoned.

Application Ser. No. 290,599 is a continuation-in-part application of my application Ser. No. 139,197, filed Apr. 30, 1971 now abandoned.

BACKGROUND OF THE INVENTION

Phenolic resins are well known for their durability, heat-resistance and water-resistance. These and other features make them desirable for use as adhesives and coatings for cellulosic materials or as coatings for metals. However, they are brittle and do not perform well as adhesives for metals unless modified by substantial adhesion of resins that have better adhesion to metals, such as epoxies, or more flexible resins, such as nitrile or chloroprene rubber, or certain vinyl resins. Most phenolic resins are applied in solution in an organic solvent; however, some low molecular weight phenols are water soluble or dispersible.

Ethylene copolymers or interpolymers are flexible thermoplastic resins whose properties generally resemble polyethylene. Certain of these copolymers, such as those of ethylene and a carboxylic acid such as acrylic acid have a superior ability of adhesion to various substrates. Such copolymers are often used as hot-melt coatings or adhesives, either alone or compounded with other thermoplastic resins, waxes, etc. A unique property of certain of the ethylene-carboxylic acid copolymers with high acid content is their ability to dissolve in aqueous alkali to give colloidal solutions by a reaction similar to saponification.

I have found that a solution or dispersion of ethylene-carboxylic acid copolymers in a volatile alkali blended with solutions of phenolic resins can give a composition that may be applied and dried as a coating, which may be first reactivated (or fused to become tacky) and then thermoset by heating, thus yielding a strong, tough, flexible material that has excellent adhesion to many substrates and is useful as a primer, adhesive, or coating. Modifications of this basic composition have been developed by addition of other materials such as other resins, fillers, pigments or dyes, solvents, surfactants, dispersants, or cross-linking agents, in order to improve such properties as stability, coatability and color.

One useful application of this composition is as a primer for use in conjunction with certain thermoplastic adhesive and coating materials, especially those based on ethylene copolymers, terpolymers, or ionomers, with and without modifiers such as coaltar pitch (U.S. Pat. No. 3,361,692).

When bonded to fibrous or porous substrates, such as wood, paper, asbestos-cement, etc., these thermoplastic adhesive compositions are too viscous, even at temperatures up to 500°F (260°C), to flow around the fibers or into pores to any considerable depth. While the adhesive may adhere or bond to the superficial fibrous or porous surface, it does not penetrate deeply. Such superficial surfaces are often weaker than the bulk of the substrate because they may be damaged by manufacturing operations such as cutting or abrading. Thus, bonds to such substrates may be relatively weak. Furthermore, bonds between metal and such fibrous or porous substrates are often subjected to severe stresses when subjected to thermal or humidity changes because of great differences in expansion characteristics of the adherends.

U.S. Pat. No. 3,211,804 teaches a method for making an adhesive or coating in which is added phenolic to olefin polymers not in an emulsion, nor in a water base dispersion, but merely blends the two resins in order to improve their characteristics such as heat resistance, clarity, solvent resistance and adhesion. However, the flow index is extremely low which indicates that the composition is cross-linked resulting in high viscosity and a loss of thermoplasticity. While my composition in the applied and cured condition has these same characteristics, it has the ability to flow readily, wet and adhere to the surfaces to be joined, before cross-linking occurs. Thus, my composition can be easily applied to surfaces before curing.

Very few adhesives are capable of withstanding cycling tests such as the American Plywood Association's soak-dry, hot-water-dry, or soak-freeze-dry cycling tests with a metal overlay on plywood. To pass such a test, it is necessary for an adhesive to be very flexible and tough and its adhesion to both the metal and the fibrous or porous substrate must be very strong and moisture resistant.

A dilute solution of my composition, applied as a thin primer coating to the porous substrates, penetrates and impregnates the surface fibers or pores and, when dried, binds and toughens the surface of the substrate. When the thermoplastic adhesive is applied with heat and pressure sufficient to cure the primer on the surface, the resultant adhesive bond is much stronger, more moisture-resistant and more heat resistant than that without the primer.

A dilute solution of my composition is also advantageous when similarly applied to metal surfaces as a primer in conjunction with the above mentioned thermoplastic adhesive for use as adhesives or protective coatings. The low viscosity, low surface tension and soap-like properties of my composition make it possible for the primer to wet the metal surfaces, even when the surfaces are contaminated with a small amount of oil or grease. The composition thus functions as a cleaner for the metal. The dried primer coating reactivates and cures when heat and pressure are applied to bond the thermoplstic to the metal and gives a bond between metal and the thermoplastic adhesive or coating that is superior to that obtained without the primer under similar conditions. It is possible to obtain satisfactory bonds at lower temperatures and shorter time-at-temperature with such primed metal. The bonds with thermoplastic composition on the primed metal are stronger, more heat resistant and more durable on long time exposure to moisture than bonds made without the primer. This improved performance with my primer is important when the thermoplastic composition is used either as an adhesive or as a protective coating on metal or other substrates for severe applications such as a coating for the insides of culverts.

Adhesives are used for bonding metal faces to cores, such as plywood, paper or metal honeycomb, fiberboard, etc., as sandwich structures or metal overlays for architectural, automotive, and other applications. My composition is an excellent adhesive for such bonding. In such applications, it should be applied to the adherends as a more concentrated solution than that used as a primer, in order to build up an adequate thickness of glue line. No primer is necessary because this compound wets and adheres to the metal and penetrates the surface of porous core materials. Afer drying, the metal and the core are assembled by applying heat and pressure to reactivate and cure the adhesive. The bonds are strong both in shear and peel strength, and resistant to moisture and heat.

This adhesive system has several advantages over competitive adhesives such as epoxies, rubber-phenolics, or thermoplastics. It may be preapplied and dried on the adherends from an aqueous solution (without fire hazard), the components can be assembled dry, and, when cured under heat and pressure, the adhesive is thermoset so that the pressure may be released and the panel handled while still hot without delamination (as would occur with thermoplastic adhesives).

In addition to the use of my compositions as primers or adhesives, I have also found that they may be used themselves as heat curing paints, enamels, or protective coatings. For such applications it is advantageous to use more concentrated solutions (compared to primers) in order to apply coatings of sufficient thickness to provide the required protection. To the aqueous basic composition of ethylene copolymers and phenolic resins it may be desirable to add modifiers such as fillers, pigments, solvents, or other resins in order to obtain the desired coating characteristics. These coating compositions may be applied to metal or other substrates by spraying, roll-coating, or other application processes as commonly used for other paints or enamels. They should then be dried and baked to fully thermoset the resin composition. Such coatings have been found to be tough, flexible, abrasion resistant, and excellent protection from corrosion under severe moisture conditions.

Another specialized use of my composition is as a coating or "core plate" for use on steel sheets for electromagnetic cores such as those in transformers, generators, or motors. The cores of transformers and other electromagnetic structures are constructed of laminations to restrict the flow of eddy currents and hereby reduce this component of the electromagnetic core loss. For this to be successful, however, it is necessary that each lamination be insulated from the others so that the eddy currents will not flow readily from one lamination to another. In some cases, insulation, in addition to that from normal surface oxide, is supplied by coating the sheets or laminations with a thin coating of varnish or organic "core plate," which has good electrical resistance and which is capable of maintaining this resistance under normal operating temperatures and pressures. When used in oil-immersed transformer cores, the core plate must not dissolve or react with the oil because the insulating properties would be destroyed. The usual method of applying this coating is to pass the sheets or laminations through rolls coated with the composition, and then through a combination drying and baking oven. The thickness and uniformity of the coating must be controlled to obtain adequate insulating properties. The coating should not be too thick, however, because this will, in effect, reduce the amount of steel in a core stack. Baking temperatures differ, depending on the composition and type of coating used. The organic varnishes require care in baking, since it is essential to volatilize off most of the vehicle and cure the resin to obtain a coating free from tackiness. Under-baking results in a soft, tacky or thermoplastic coating which will not have satisfactory insulating properties under the pressure and temperature conditions present in the core during service. Care also must be taken to prevent over-baking because the varnish will become carbonized and the insulation characteristics of the coating will be thereby impaired.

Presently used organic varnish core plate requires the use of flammable organic solvents which are too hazardous for application under preferred plant conditions. There is a clear need in the art for a coating material which may be applied to the steel laminate but which is not flammable. This new material must also meet several other requirements, e.g., it must have good insulating properties (0.50 amperes maximum at 300 psi and 150°C ASTM A344-68), it should have an obvious color, it must be inert to oil, and it should be amenable to coating in dry thicknesses ranging from about 0.15 mils to 0.03 mils (3.6 to 0.7 microns). Further, the coating should act as a lubricant for the die during punching of the core forms.

My compositions can meet all the above requirements for a coating of electromagnetic steels, when applied as a thin, water-based coating, dried, and baked at sufficient temperature and time to thermoset the coating as completely as possible without deterioration.

This "core plate" coating composition may also be used as an adhesive for bonding the sheets or lamillae of the electromagnetic cores by a different processing method. After applying the coating composition, it is dried at a temperature and time sufficient only to evaporate the volatile materials but not enough to cure the coating. This uncured coating is tough and sufficiently adherent to withstand the fabrication and assembly of the core. After the core with the uncured coating is clamped together, it is baked to reactivate and cure the coating, thus causing the sheets to adhere to one another. This process of adhesive bonding of electromagnetic cores may be of value in reducing the need for mechanical fasteners to hold the core laminations together and for reducing the vibration and noise that occurs in unbonded cores because of magnetostriction.

The vibration damping properties of my adhesive compositions for bonding laminates can be greatly improved by replacing about 20 to 80 percent of the ethylene-acrylic acid copolymer with ethylene-vinyl acetate copolymers or terpolymers or their acid which soften and improve the viscoelastic damping properties of the adhesive compound. Dispersions of these terpolymers and copolymers are available as Elvax D dispersions from E. I. duPont de Nemours and Company. Bonded metal laminates with these modified damping adhesive compositions have been found to be very effective in damping vibration and sound. They should be useful not only in reducing the noise and vibration of electromagnetic cores as mentioned above, but also for vibration and sound damping of metal components of machines, appliances, furniture, etc.

Thus, among the objects of this invention are the following:

(1) To provide a thermosetting adhesive and coating composition that may be applied from an aqueous dispersion.

(2) To provide a material for use as a primer on various substrates to improve the bonds with certain thermoplastic adhesives and coatings.

(3) To provide an adhesive material suitable for bonding metal to various substrates such as metal, paper, wood, ceramics, etc., especially for bonding laminates, or sandwich structures.

(4) To provide a material for use as a thermosetting coating, paint, or enamel for the protection of surfaces of metals and other substrates.

(5) To provide a material suitable for applying a thin insulating and lubricating coating or "core plate" to steel sheets for use in laminated electromagnetic cores.

(6) To provide an adhesive material with good viscoelastic properties suitable for bonding metal laminates to be used for vibration or sound damping applications.

These and other objects will become apparent from the following detailed specification.

DETAILED DESCRIPTION

The copolymers of ethylene and ethylenically-unsaturated carboxylic acid suitable for use in my composition are those with preferably about 18 to about 24 percent of acid by weight since these are more readily soluble or dispersible in alkali and they have better adhesion properties than those with lower acid content. Suitable acids copolymerized with ethylene to form the copolymers are the ethylenically-unsaturated acids such as acrylic, methacrylic, crotonic, or isocrontonic acids. Preferred copolymers are derived from acrylic or methacrylic acid.

The acid groups of the copolymer react with hot solutions of aqueous alkali to form salts that disperse in water to form colloidal solutions resembling soaps. Where the alkali is volatile, the colloidal solution of the salt may be returned to the water insoluble acid form by drying, and heating to drive off the water and the volatile alkali. Aqueous ammonium hydroxide is preferred, but any water soluble volatile alkali may be used, including amines such as ethanolamine, diethylamine, morpholine or mixtures thereof. For making fluid solutions up to about 24 percent resin solids, the resin is placed in an aqueous solution containing at least a stoichiometric amount, and preferably from about 10 to about 15 percent in excess of the stoichiometric amount of volatile alkali. The mixture is heated and stirred in a closed vessel to a temperature usually of from about 90°C to about 130°C, and maintained at this temperature while being stirred until the resin is dissolved. Using this method, fluid solutions containing up to about 24 percent resin solids may be obtained in compositions which are useful for thin coating such as primers or electromagnetic steel coatings. It is also possible to obtain fluid solutions containing up to 30 or 40 percent resin solids depending on the molecular weight of the copolymer, by using less water and less than a stoichiometric amount of ammonia. In this case the dispersion is partly a solution and partly a sol. These more concentrated solutions are useful for adhesives and thicker coatings. Ethylene-acrylic acid copolymer resins suitable for use in the compositions of my invention are sold by Union Carbide Corporation under the trade-names EAA-9300 and EAA-9500.

The total ethylene copolymer, terpolymer, and ionomer should comprise from about 25 to about 95 weight percent of the total resin solids, preferably from about 50 to about 86 weight percent.

Certain other dispersions of copolymers, terpolymers, or ionomers may be substituted for all or part of the ethylene-acrylic acid copolymer ammonium solutions in my composition in order to modify its properties. Such copolymer dispersions may contain ethylene-vinyl acetate; terpolymer dispersions may contain ethylene-vinyl acetate-carboxylic acids; and ionomer dispersions may contain metallic salts of ethylene-carboxylic acids. Such dispersions are commonly made by proprietary emulsion-polymerization methods and are often stabilized by surfactants. Typical dispersions of this type are commercially available as Elvax D from E. I. duPont de Nemours Company. While I have obtained useful compositions substituting 100 percent of the above type of dispersion for ethylene-acrylic acid dispersions, I have generally preferred to limit the substitution to between 10 and 60 percent of the ethylene resin solids depending on the application, since it appears that a substantial proportion of the ethylene-acrylic acid copolymer solution is needed to give better dispersion of the other components of my composition and better properties when applied as an adhesive or coating.

One advantage of the mixed dispersions of ethylene-acrylic acid copolymers with the above types of ethylene-copolymers, terpolymers and ionomers, has been greatly increased stability of my compositions. I have also found that the replacement of 40 to 80 percent of the ethylene-acrylic acid solids with these ethylene-vinyl acetate copolymer or terpolymer modifies the properties of the dried and cured compounds so that they have good viscoelastic damping properties and are useful as a sound or vibration damping adhesive layer between metal laminates. Ethylene ionomer dispersion additions have not been found to contribute viscoelastic damping properties of the cured compound like the above ethylene-vinyl acetate copolymers or terpolymers but they may stabilize my dispersions and toughen the adhesive or coating.

The phenolic resins which may be used in my composition are preferably those of the heat-reactable, water-soluble or dispersible, resol or A-stage type. These resins may be prepared by the alkaline catalyzed reaction of a phenol and formaldehyde. The reaction is stopped when essentially no unreacted phenol is left and the product contacts a substantial amount (more than 10 percent) of trimethylol phenol. A suitable means of preparing resins of this type is disclosed in U.S. Pat. No. 2,834,755 dated May 13, 1958 to Higashi and Jarvi. Solutions of resins of this type are produced by various companies under trade-names such as AROFENE 352 (Ashland Oil and Refining Co.), BAKELITE BRL-1031 (Union Carbide Corp.) or CASCOPHEN MB717-146 or SL699-104A (Borden Chemical Co.). Typical properties of these resin solutions are

| Physical Form: | Aqueous solution | |
|---|---|---|
| Properties: | Solids Content, % | 70–74 |
| | Viscosity, Brookfield at 25°C, cps | 250–500 |
| | Reactivity | |
| | Hot Plate Cure at 150°C, sec. | 75–90 |
| | Gel time at 121°C, min. | 13–17 |
| | Water Tolerance, % | 1000 minimum |
| 1.235–1.255 | Specific Gravity at | 25°C/25°C |

While water soluble phenolic resins are generally preferred because of ease of dispersing them in my composition, it is also possible to use other heat-reactable phenolic resins that are dissolved in alcohols or other solvents, by emulsifying the solution into the ethylene-acrylic acid ammonium solutions. The phenolic resin may comprise from about 5 to about 75 weight percent of the total resin solids, preferably from about 14 to about 50 weight percent. The greater the amount of phenolic resin, the greater is the high temperature resistance of the composition.

The total resin solids in my composition varies according to final use but generally should be between about 15 and 45 weight percent of the emulsion. Where superior wetting properties and a low solution viscosity are necessary, it is possible to have less resin solids than the stated generally useful minimum and still obtain most of the benefits of my composition.

Components other than the dispersions of copolymer and the phenolic resins are optional constituents added to improve such properties as stability, foam control, viscosity, and color. Suitable addition components are coal tar fractions such as creosote, high boiling tar oil, wax oil or pitch, surfactants, dispersants, solvents, cross-linking agents, fillers, extenders, pigments, and foam control agents. The coal tar fraction may act as a suspension stabilizer, help prevent degradation of the ethylene copolymer by oxygen, provide moisture resistance, and have a plasticizing effect (especially the lower boiling fractions). The coil tar fraction may comprise from 0 to about 60 weight percent of the total resin solids present.

Pigments or fillers, including inert oxides such as iron oxide or titania or silicates such as clays or calcium silicate may be added to my composition in finely divided form in amounts up to about 50 percent and preferably from about 5 to about 10 percent of the total solids depend on the final use of the composition. These components are added to color, extend and improve the durability of the composition. Certain fillers such as calcium silicate may assist in catalyzing the cure of the composition.

In preparing the compositions of my invention, the first step is to form a dispersion of the ethylene and ethylenically unsaturated carboxylic acid copolymer. As described above, the ethylene copolymer resin is placed in a pressure vessel with an aqueous solution of alkali to react with the carboxyl groups. When the resin used is the preferred ethylene-acrylic acid copolymer and the alkali is the preferred aqueous ammonium hydroxide, the mixture is heated to form about 90° to about 130°C until the resin dissolves, giving a soap-like aqueous solution or dispersion. The dispersion is transferred to a vessel having high-shear mixing apparatus. To this copolymer dispersion the desired quantity of phenolic resin, along with other resin dispersions, fillers, pigments, is added with vigorous stirring. The pH of the phenolic resin solution shall be adjusted over pH 8 by the addition of ammonia, amines or other alkali.

Small amounts of surfactants, defoamers and solvents may be added for ease in preparing my compositions. Thus, pyridine, xylene, diacetone alcohol, etc. may be combined with the coal tar fraction, alcohols such as 1-butanol, and ammonium hydroxide, etc. may be added to the phenolic resin solution and defoamers and surfactants such as acetylenic glycols may be added to the copolymer emulsion.

The composition of my invention is then applied to a substrate in any conventional manner such as dipping, spraying, rolling, etc. and dried. In applications which do not require maximum adhesion obtainable using the composition of my invention, the cleaning of the substrate may be reduced or eliminated prior to coating, since the coating itself is a good detergent. Among the suitable substrates are metals including carbon, stainless, galvanized, aluminum coated or silicon electrical steels, wood, fiber board, paper, galvanized steel, etc.

The following examples illustrate the results obtained when specific coating compositions are applied to several types of substrates. These experiments are to be understood as being merely illustrative and in no way limiting.

EXAMPLE 1

The simplest composition of my invention was prepared by mixing the phenolic resin solution into the ammonium solution of the ethylene-acrylic acid copolymer. As an example, twenty-seven parts of AROFENE 352 (phenolic resin) is slowly added to 100 parts of a 20 percent solids ammonium solution of EAA 9300 with vigorous stirring, to give approximately equal parts of phenolic resin and copolymer resin solids. The addition of ten to thirty parts of ethanol or 2-propanol reduces foaming and improves wetting and stability of the solution somewhat but is not necessary for the performance of the compound. The resulting mixture is a very fluid, light brown, milky colloidal solution. It has low surface tension and a tendency to foam. The shelf life of this mixture at 24°C is limited to about 2 to 15 days after which the solution becomes green in color and a brown precipitate of phenolic resin settles. When refrigerated at about 8°C, the composition is stable for longer than six months.

Coatings of these compositions, dried and heated at about 300°F for 20 minutes or 450°F for 1 minute the thermoset as indicated by loss of tack and increased hardness at elevated temperatures. When applied to metals, such as carbon steel, galvanized steel or stainless steel, the solution wets the surface well, and the cured coating is very adherent, tough, and heat and moisture resistant. When used as a primer (usually as a more dilute solution) applied to metals, wood, or paper, these compounds improve the strength and durability of bonds of certain other thermoplastic adhesives, especially those containing ethylene copolymers, such as USS NEXUS P-1001 or P-1003, and duPont's Surlyn A.

EXAMPLE 2

Coal tar pitch is added to the ethylene-acrylic acid-phenolic dispersions as extenders to improve durability, moisture resistance, and adhesive properties of the compounds. Blends with coal tar pitch are more stable at room temperatures than the ethylene copolymer-phenolic dispersions without pitch. A typical formulation (SX 9001-6870-50A) is as follows:
  100 parts (by weight) — ethylene-acrylic acid copolymer (EAA 9300) dissolved in aqueous ammonia (20 percent solids)
  135 parts — phenolic resin (about 70–75 percent solids) (AROFENE 352)

10 parts — coal tar pitch (70°C fiber grade)
20 parts — ethanol or 2-propanol (to assist wetting of substrate and drying of coating)
10 parts - xylene (to dissolve pitch)
5 parts - pyridine (to aid in dissolving and dispersing pitch)
1 part - 1-octanol (antifoam)

This compound may be blended by milling in a ball-mill or by dissolving the pitch in the xylene and pyridine and mixing it into the other components with a high-shear mixer until the pitch is colloidally dispersed.

When the pitch is adequately dispersed, this compound has a shelf-life of at least several months at a room temperature of about 25°C.

EXAMPLE 3

The composition of Example 2 is coated on steel as a primer for an adhesive prepared according to Example 1 of U.S. Pat. No. 3,361,692. Without the primer the adhesive has a peel strength of 19 to 37 lbs per inch; with the primer, the peel strength is 69 to 77 lbs per inch (ASTM Test D 903).

EXAMPLE 4

The composition of Example 2 is used as a primer for steel-to-plywood bonds using the adhesive of Example 3. Using 0.018 inch carbon steel, the peel strength increases from 32 to 50 lbs per inch to 90 to 130 lbs per inch.

EXAMPLE 5

The heat resistance of the bond produced in Example 3 is tested. A lap adhesive joint is made with and without the primer and heated in an oven. Without the primer the bond fails at 77°C. With the primer the bond fails at 90°C. Thus, heat resistance of the bond when primer is used is found to be improved.

EXAMPLE 6

Bonds of galvanized steel with duPont's Surlyn A adhesive film are greatly enhanced by the application of the composition of Example 2 as a primer. The primer is applied as a thin coat to the galvanized steel surfaces and dried two to ten minutes at 150°C. Then the Surlyn A 1555 film is placed between the primed surfaces under pressure and the assembly heated to about 200°C. Lap shear tests at room temperature on the bonds with the primer give cohesive breaks at about 2,600 psi; without primer, the breaks are partially adhesive and bonds fail at from 900 to 1,400 psi (ASTM D1002).

EXAMPLE 7

A composition is made similar to that in Example 2 but with high-boiling coal tar oil (95 percent boiling above 355°C) substituted for the 70°C fiber grade pitch fraction of coal tar. This composition is easier to produce because the tar oil is more readily colloidally dispersed than the pitch, using simple high-shear mixers. The tar oil has the same stabilizing effect on the copolymer-phenolic as the pitch addition, and there is no significant settling during storage at room temperature for several months. Performance is comparable to Example 2 formulation.

EXAMPLE 8

When used as an adhesive or coating by itself (rather than as a primer for another adhesive or coating), it is often desirable to have a higher solids content in the dispersion in order to obtain thicker coatings. The formula of such an adhesive is as follows in parts by weight:

| | |
|---|---|
| Ethylene-acrylic acid copolymer (30% ammoniacal dispersion of EAA 9300) | 100 |
| Phenolic resin (BRL-1031) | 7 |
| 2-Propanol | 5 |
| High-boiling tar oil 995% boiling above 355°C) | 7 |
| Xylene | 3.5 |
| Morpholine (optional, to adjust viscosity) | 1 |

The high-boiling tar oil is combined with the xylene and morpholine, mixed with the phenolic and added to the copolymer dispersion to which the 2-propanol has previously been added.

This compound is used for bonding steel wire to fiber pads. The wire is dipped in the dispersion, dried, and then heated to about 200°C while being pressed against the fiber. This compound gives a sufficient thickness of coating on the wire and during the heating it first becomes tacky and soft so that it penetrates and adheres to the fiber and then thermosets, becoming rigid and tack-free at 200°C.

EXAMPLE 9

It is desirable to add substantial amounts of fillers and/or pigments to these compounds to improve their properties against moisture, heat, wear, weathering, and other exposure conditions; to color the coatings; to reduce their cost; to thicken the dispersions to obtain thicker coatings and to control penetration into the substrates; or to reduce their thermal expansion coefficients to more nearly match that of the substrates. An example of such filled composition is as follows:

| | |
|---|---|
| Ethylene-acrylic acid copolymer (per Example 1) | 300 ml |
| Phenolic resin (BRL-1031) | 14 ml |
| High-boiling tar-oil | 14 ml |
| Morpholine | 2 ml |
| 2-propanol | 10 ml |
| Xylene | 7 ml |
| Calcium silicate | 30 g |
| Iron oxide (precipitator dust) | 30 g |
| Magnesium Montmorillonite | 3 g |
| Lignosulfonate | 1.2 g |

These ingredients are readily blended in a high-speed mixer. The 2-propanol is pre-mixed with the phenolic resin and the xylene with the tar oil to assist in dispersion. This compound, applied to metal, dried, and cured at about 200°C for 5 minutes, forms a tough, adherent coating. It can also be applied to metal and plywood, dried, and partially cured at 200°C for about 3 minutes with the faces open to give a tough coating. When these coated surfaces are assembled and placed in a hot platen press at about 200°C for 15 to 60 seconds, the compound reactivates and then cures, forming a strong adhesive bond with good moisture and heat resistance. When the metal is pulled from the plywood, the failure is deep in the wood.

EXAMPLE 10

An adhesive composition containing CaSiO₃(Table I) is applied to the surface of plywood to be laminated with steel. This adhesive is applied to the plywood surface and dried. Later the laminate is assembled and hot pressed to reactivate and cure the adhesive. It gives bonds with good handling strength after curing 1 to 2 minutes at temperatures of 350° to 365°F in a press at 200 psi. These plywood-to-steel laminates posses excellent strength and good peel and moisture resistance under a variety of conditions (Table II).

EXAMPLE 11

An adhesive composition suitable for bonding metal faced paper honeycomb sandwich panels is shown designated as No. 2 adhesive in Table I. Table III compares the flexure strength of such bonded sandwiches with sandwiches using adhesives known to the art. The adhesive dispersion is applied to the honeycomb cell edges by roll-coating or dipping and then dried. These coated paper cores may be stored for many months before assembly. The metal facing sheets may be primed with a similar but more dilute composition, but this is not essential. The heated sandwich is heated to 350° to 365°F for 1 minute or more under contact pressure to cure the composition.

EXAMPLE 12

A composition of my invention suitable for use as a coating or "core plate" for steel sheets for electromagnetic cores is prepared according to the formula in Table IV. The compound consists essentially of a mixture of ethylene acrylic acid copolymer ammonium solution and aqueous phenolic resin solution with minor additions such as alcohols, monoethanol amine and surfactant to improve coating characteristics and stability of the mixture, and phosphate to catalyze the cure. The composition is prepared by pre-mixing the two parts as indicated in Table IV and then blending Part A into Part B with a high-shear mixer.

The composition is applied to coils of steel for electromagnetic core applications by roll-coating, dried and cured by passing through an oven so that it is exposed to a temperature between about 370°C and 425°C for about 30 seconds. The dry coating thicknesses are about 1 to 3 microns thick and are dark brown in color. The Franklin insulation values (ASTM A344-68) are good (less than 0.50 amperes at 300 psi and 150°C). In subsequent fabrication of the coated sheets into electromagnetic cores, the die-life is approximately doubled, indicating better lubricating properties than that of conventional varnish coating.

EXAMPLE 13

The procedure of Example 12 is followed to prepare a like composition set forth in Table IV differing principally from the composition of Example 12 in that an ethylene-methacrylic acid ionomer dispersion or an ethylene-vinyl acetate dispersion is substituted for a portion of the ethylene-acrylic acid solution. Minor additions such as lignosulfonate and bentonite clay dispersants and diacetone acrylamide crosslinking agent assist in curing the composition.

EXAMPLE 14

This composition is more stable for long time storage than that of Example 12, especially when the concentration exceeds 30 percent solids.

Elvax D 1112 copolymer dispersion is substituted for the Elvax D 1249 ionomer dispersion of Example 13 in the same amount and mixed as in Example 12. The resulting compound is applied to steel sheet and dried only (not cured). Laminates are made by pressing two coated sheets together at about 200°C and 100 psi for 1 hour to reactivate and cure the adhesive compound and bond the sheets together. The sample is tested for sound damping quality by the vibrating reed test. Reverberation time ranges from about one second at room temperature to about 0.08 second at from 120°C to 150°C. This compares to about 4 to 5 seconds for solid steel of the same thickness as the laminate.

EXAMPLE 15

Three compositions are used as primers for an adhesive prepared according to Example 1 of U.S. Pat. No. 3,361,692 and the results compared. Primer No. 1 is the ethylene-acrylic acid copolymer dissolved in sufficient ammonium hydroxide to give a dispersion having 20 percent solids. Primer No. 2 is the same copolymer blended with a phenolic resin. Primer No. 3 is the same copolymer blended with a phenolic resin and coal-tar pitch. The compositions are listed in Table V. The primers were applied to the plywood and dried at 150°C for 2 to 10 minutes. The adhesive film was first laminated to the steel sheet by heating to about 200°C. The coated sheet and the primed surface of the plywood are then reheated and assembled in a roller press. Table VI shows the results of peel tests on these steel-to-plywood bonds and indicates that all three primers increase the bond strength, Primer No. 3 being outstanding.

EXAMPLE 16

A sandwiched structure with a paper honeycomb core is bonded using an adhesive as disclosed in Example 1 of U.S. Pat. No. 3,361,692 and the ethylene copolymer phenolic coal-tar pitch composition of Example 3. The results indicate that the primed structures are stronger both in flexure and peel strength than commonly used high-quality contact adhesives and equal in flexure but superior in peel strength compared to epoxy adhesives. Procedure for making these honeycomb and sandwiched structures is to: (1) Apply the primer to the cell edges of the paper honeycomb and dry it; (2) Assemble the panels with the loose adhesive film interleaved between the core and each of the steel faces; and (3) Hot press the assembly at about 200°C for 0.5 to 10 minutes at contact pressure to cure the composition.

EXAMPLE 17

Steel facing is bonded to maple lumber using an adhesive as disclosed in Example 1 of U.S. Pat. No. 3,361,692. The unprimed joint has a peel strength of 28 – 33 ppi. The peel strength, when primed with a primer having the composition of Primer No. 3 in Table V, is 48 – 57 ppi.

Table I

| Components | No. 1 Adhesive Designed for Metal to Plywood | No. 2 Adhesive Designed for Metal to Paper Honeycomb |
|---|---|---|
| Ethylene-acrylic acid polymer using 30% solids ammoniacal emulsion | 200 ml | 200 ml |
| Phenolic resin solution (per Example 1) | 30 ml | 20 ml |
| High-boiling tar-oil (coal-tar) | 3.5 ml | 3.5 ml |
| Xylene | 5 ml | 5 ml |
| Calcium silicate | 5 grams | 5 grams |
| Filler (iron oxide) | — | 20 grams |
| Miscellaneous additives to adjust viscosity dispersion foaming or adhesion | 0.8 grams | 3.0 grams |

Table II

Average Joint Strength of Metal-to-Plywood Bonds (Adhesive No. 1)

| | |
|---|---|
| Tensile Shear Strength (1 inch square lap of 0.062-inch thick steel to fir plywood. Tested dry at room temperature) | 875 psi (100% wood failure) |
| Peel Tests (ASTM D903, with 0.018-inch thick steel to fir plywood) | |
| Tested dry at room temperature | 39 ppi* |
| Tested dry at 250°F | 25 ppi** |
| Tested at 120°F after exposure at 150°F, 100% relative humidity for: | |
| 1 day | 35 ppi* |
| 3 days | 37 ppi* |
| 7 days | 25 ppi** |
| Tested at approximately −100°F after exposure at that temperature for: | |
| 8 hours | 40 ppi* |
| 24 hours | 25 ppi** |

\* Approximately 75 to 80 percent wood failure
\*\* Approximately 50 to 60 percent wood failure

Table III

Flexure Strength of Steel-Faced Paper-Honeycomb Sandwiches Bonded with Various Adhesives

ASTM C-393

| | Flexural Load to Failure Pounds per inch width |
|---|---|
| Contact Adhesive EC1357 (3M Co.) or G701 (PPG, Inc.) | 80 |
| Epoxy Adhesive USS NEXUS S8003 | 150 |
| Thermoplastic Film Adhesive USS NEXUS P1003 (alone) | 85 |
| USS NEXUS P1003 with primers PX 2001 or SX 9001 | 172 |
| Adhesive No. 2 (Table I) | 172 |

*Samples were 3 inch by 14 inch by 1 inch thick tested with 12-inch span, quarter-point loading.
Honeycomb cores were Union Camp Corp. (80(80)½) longitudinal. Carbon steel faces were 0.047 inch thick.

Table IV

Sample Core-Plate Formula

| | Parts by Weight | |
|---|---|---|
| | Example 12 | Example 13 |
| Part A | | |
| ethylene-acrylic acid copolymer (22% solids ammonium solution of EAA 9500) | 300 | 190.0 |
| ethylene-methacrylic acid ionomer dispersion (42% solids) or Elvax D 1249 (du Pont) | — | 180.0 |
| acetylenic glycol surfactant and anti-foam | 0.6 | 0.4 |
| lignosulfonate | — | 2.0 |
| bentonite clay | — | 3.6 |
| diacetone acrylamide (crosslinking agent) | — | 12.0 |
| amido-ammonium phosphate (30% aqueous solution) | — | 7.5 |
| ammonium phosphate, dibasic (33% aqueous solution) | 7.5 | — |
| Part B | | |
| phenolic resin solution AROFENE 352 (code 595-090) (Ashland Chemical Co.) | 60.0 | 35.0 |
| 1-butanol | 7.0 | 4.5 |
| furfuryl alcohol | — | 2.5 |
| monoethanolamine | 5.0 | 3.5 |
| ethanol | 8.0 | — |
| Total | 388.1 | 441.0 |
| Estimated total solids — | 32.6% | 36.7% |

Table V

Primer Compositions

| Primer No. | 1 | 2 | 3 |
|---|---|---|---|
| Ammonium solution of ethylene-acrylic acid copolymer (20% solids) (per Example 1) | 100% (by vol) | 66.7% (by vol) | 50% (by vol) |
| Phenolic resin (per Example 1) | 0 | 9% | 7.8% |
| Coal-tar pitch 70°C (Fiber grade) | 0 | 0 | 5.0% |
| Ammonium hydroxide (excess) | 0 | 2.25% | 0 |
| Ethanol | 0 | 10.6% | 0 |
| 2-Propanol | 0 | 0 | 10.0% |
| Xylene | 0 | 0 | 5.0% |
| Pyridine | 0 | 0 | 2.5% |
| 1-Octanol | 0 | 0 | 0.5% |
| Water | 0 | 11.2% | 20.25% |
| Percent Solids | 20% | 20% | 20% |

Table VI

Peel Strengths of Steel-to-Plywood Bonds

| Adhesive | Primer on Plywood | Peel Strength * lb/inch | Failure |
|---|---|---|---|
| USP 3,361,692 Example 1 | None | 32–50 | In superficial wood fibers |
| USP 3,361,692 Example 1 | No. 1 | 46–57 | Somewhat deeper in wood |
| USP 3,361,692 Example 1 | No. 2 | 45–61 | Deeper in wood and some cohesive |
| USP 3,361,692 Example 1 | No. 3 | 90–130 | Cohesive in adhesive film |

*Tested as manual 180 degree peel of ½ inch wide, 26 gage carbon steel strips bonded to exterior grade fir plywood.

I claim:

1. A composition useful as a coating or adhesive consisting essentially of an aqueous dispersion of:
   a. from about 25 to about 95 weight percent of resin solids of a copolymer of ethylene and acrylic acid, wherein the acrylic acid constitutes about 18% to 24% of the copolymer; said copolymer being dissolved in aqueous ammonium hydroxide to form an ammonium salt or ionomer solution or dispersion;
   b. from about 5 to about 75 weight percent of resin solids of a water dispersible, heat reactable, resol, A-stage type phenolic resin, essentially free of unreacted phenol and containing a substantial amount of trimethylolphenol.

2. A composition as in claim 1 including an ethylene-methacrylic acid ionomer, said ionomer containing at least 75 percent ethylene and constituting not more than 60 percent of the total resin solids.

3. A composition as in claim 1 including an ethylene-vinylacetate copolymer or ethylene—vinylacetate—ethylenically unsaturated carboxylic acid terpolymer containing at least 20 percent ethylene and constituting not more than 75 percent of the total resin solids.

4. A composition for the application as coatings or adhesives consisting of an aqueous dispersion of:
   a. from about 25 to about 95 weight percent of resin solids of a copolymer of ethylene and an acid selected from the group comprising acrylic and methacrylic acids, wherein the acid constitutes about 18 to 24 percent of the copolymer; said copolymer being dissolved in aqueous solution of a water soluble volatile alkali to form an alkali salt or ionomer solution or dispersion;
   b. from about 5 to about 75 weight percent of resin solids of a water dispersible, heat reactable, resol, A-stage type phenolic resin, essentially free of unreacted phenol and containing a substantial amount of trimethylolphenol.

5. A composition as in claim 4 including an ethylene-methacrylic acid ionomer, said ionomer containing at least 75 percent ethylene and constituting not more than 60 percent of the total resin solids.

6. A composition as in claim 4 including an ethylene-vinylacetate copolymer or ethylene—vinylacetate—ethylenically unsaturated carboxylic acid terpolymer containing at least 20 percent ethylene and constituting not more than 75 percent of the total resin solids.

* * * * *

UNITED STATES PATENT OFFICE
CERTIFICATE OF CORRECTION

Patent No. 3,843,576         Dated  October 22, 1974

Inventor(s) Robert E. Parkinson

It is certified that error appears in the above-identified patent and that said Letters Patent are hereby corrected as shown below:

Column 6, line 67, delete entire line and insert --
-- Specific Gravity at
   25° C/25° C.           1.235 - 1.255 --

Column 10, line 16, "995%" should read -- (95% --. Column 12, under EXAMPLE 14, cancel the first paragraph, lines 3-5, and insert same in Column 11, under EXAMPLE 13, as the last paragraph.

Signed and sealed this 21st day of January 1975.

(SEAL)
Attest:

McCOY M. GIBSON JR.              C. MARSHALL DANN
Attesting Officer                Commissioner of Patents